United States Patent [19]
Farrell et al.

[11] 3,815,627
[45] June 11, 1974

[54] VALVE ASSEMBLY

[75] Inventors: Thomas C. Farrell, Glenshaw;
Harry W. Fisher, Pittsburgh, both of Pa.

[73] Assignee: Rockwell International Corporation, Pittsburgh, Pa.

[22] Filed: Dec. 19, 1972

[21] Appl. No.: 316,487

[52] U.S. Cl................. 137/486, 137/491, 73/199, 137/553
[51] Int. Cl. ............................................ G05d 7/03
[58] Field of Search ........... 137/486, 489, 495, 491, 137/492, 492.5, 140, 220, 553; 73/199, 207; 251/26, 337, 19, 35; 92/95, 100

[56] References Cited
UNITED STATES PATENTS

| | | |
|---|---|---|
| 1,230,971 | 6/1917 | Wilson ........................... 137/140 X |
| 1,407,993 | 2/1922 | Earl ............................... 137/486 X |
| 1,586,705 | 6/1926 | Roucka ........................... 137/486 X |
| 2,989,072 | 6/1961 | Banker ............................... 137/491 |
| 3,003,516 | 10/1961 | Granberg et al. ............... 137/491 X |
| 3,131,714 | 5/1964 | Elliott et al. .................... 137/486 X |
| 3,173,441 | 3/1965 | Elbogen et al. ................. 137/491 X |
| 3,177,889 | 4/1965 | Hardison ......................... 137/491 X |
| 3,347,586 | 10/1967 | Sharp ............................. 137/140 X |
| 3,369,561 | 2/1968 | Zimmerman et al. .............. 137/486 |

*Primary Examiner*—Henry T. Klinksiek
*Assistant Examiner*—Robert J. Miller

[57] ABSTRACT

A valve assembly capable of providing a substantially constant rate of flow in a fluid system and of measuring total fluid flow.

34 Claims, 12 Drawing Figures

VALVE ASSEMBLY

BACKGROUND AND SUMMARY OF THE INVENTION

This invention relates generally to valves and more particularly to a combined meter and valve assembly capable of providing a constant rate of flow in large fluid flow systems, as for example a water irrigation system, and for measuring and registering the total fluid flow through the system.

In a large fluid flow installation such as a water irrigation system desired flow rates may fluctuate within a wide range, for example, 270 to 2700 gallons per minute and water head pressure may vary from 5 to 175 feet of water. A valve in such a system is required to provide a preset constant flow rate at any selected point within the range and must be capable of opening or closing smoothly against any water head pressure. In addition, the total fluid flow through the control valve and into the irrigation ducts should be accurately measured and registered.

In the past, various types of flow control valve assemblies have been proposed. One combination meter and flow control valve assembly is illustrated in U.S. Pat. No. 3,593,575, and other flow rate controllers are shown in U.S. Pat. Nos. 2,888,032; 3,177,891; and 3,252,477. However, the novel meter valve assembly disclosed in this application is considered to be a significant improvement over such prior valve constructions.

Accordingly, a primary object of this invention resides in the provision of a novel flow rate control valve assembly capable of maintaining a substantially constant rate of flow in a fluid system even though inlet fluid pressure may fluctuate widely.

Another object of this invention resides in the provision of a novel combination meter valve assembly capable of maintaining a substantially constant rate of fluid flow and of registering the total flow in a fluid system.

Still another object of this invention resides in the provision of a novel flow rate control valve assembly including a main hollow piston valve member which controls the fluid flow through the main valve body, and a pilot regulator unit which acts in response to fluid pressure at the inlet of the valve assembly to position the main valve member as required to maintain a constant rate of flow. The piston member is vertically reciprocable in a valve body to control fluid flow between a bottom inlet and side outlet. Inlet fluid is passed into the hollow piston through its bottom head and the pilot regulator unit controls the fluid drained from a pressure chamber within the hollow piston to the valve outlet. Consequently, a pressure differential established across the head of the piston controls the position of the piston to regulate flow through the main valve assembly. The pilot regulator unit is of the diaphragm actuated type which acts in response to the fluid pressure differential sensed across an orifice plate mounted in the inlet of the valve body. A shut-off valve is connected in the drain path from the pilot valve and pressure chamber, and when the shut-off valve is closed, it prevents any fluid drain from the pressure chamber, thereby equalizing the pressures across the piston head and causing the piston to close and block flow through the main valve.

A further object of this invention resides in the provision of a novel shut-off gate valve, which is closed at a gradual controlled rate, thereby causing the main piston valve member to gradually, smoothly close within an optimum time period. As a result, damage to the valve assembly and the piping system is avoided.

Another object of this invention resides in the provision of a novel meter valve assembly as described above wherein a flow totalizer or register element is mounted in the inlet line of the main valve body upstream of the piston valve member to measure the total flow through the valve assembly.

Other objects and advantages of the invention will become apparent from reading the following description of the invention wherein reference is made to the accompanying drawings throughout which like numerals indicate like elements.

DESCRIPTION OF PREFERRED EMBODIMENT

Figure 1:
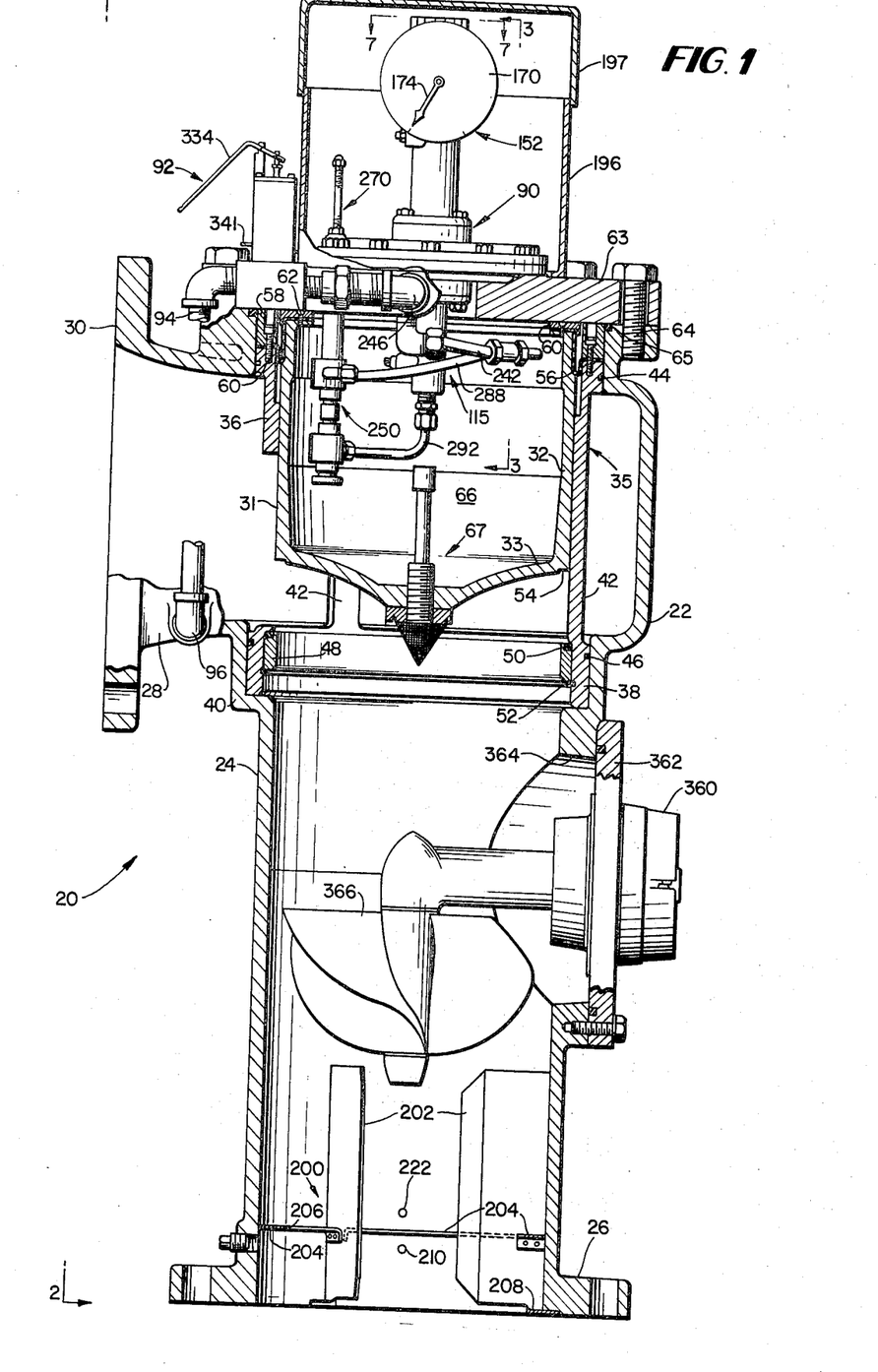
FIG. 1 is a fragmentary section elevation view of the novel valve assembly constructed according to the invention, with the main piston valve member shown in its maximum open position.
Figure 2:
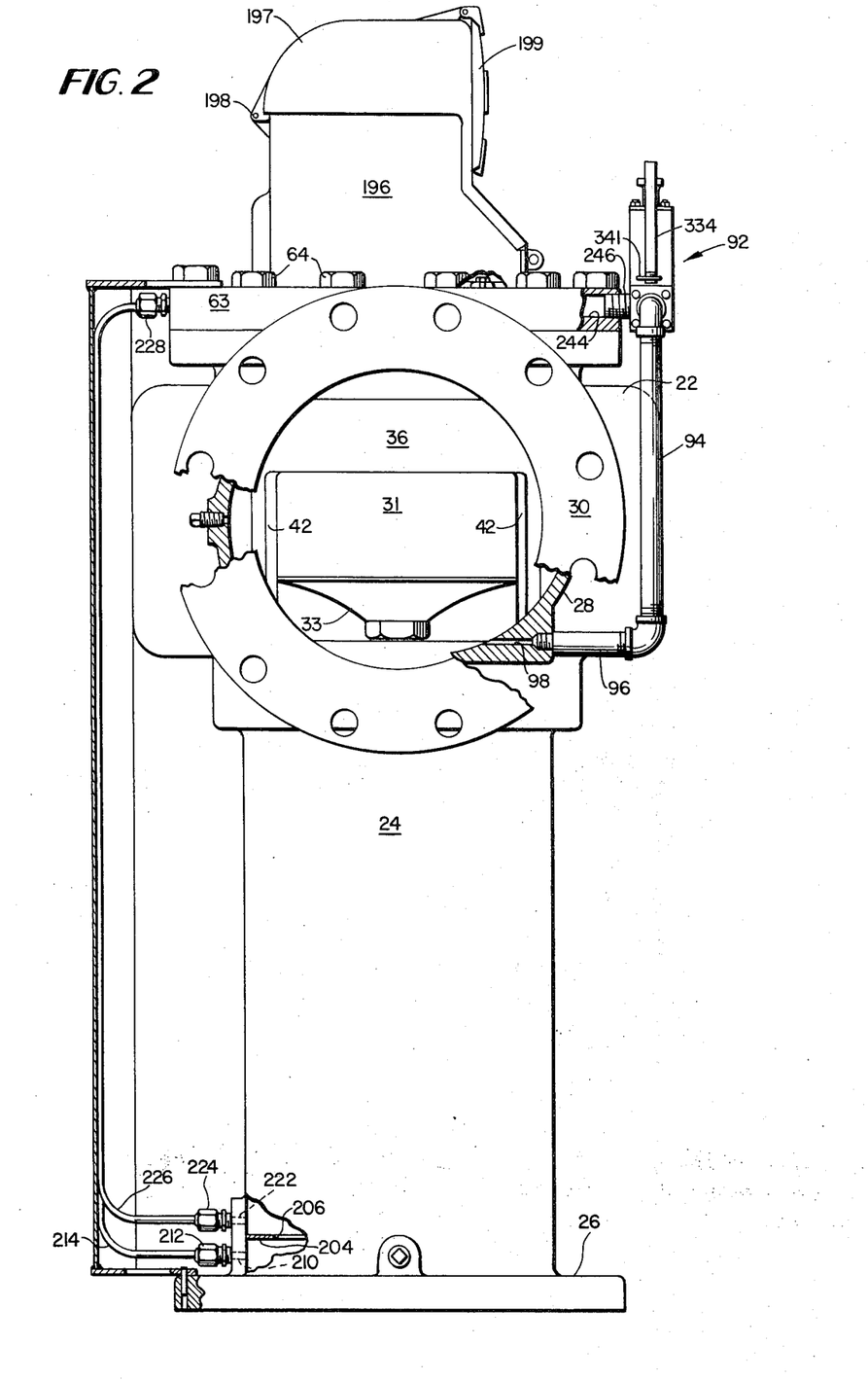
FIG. 2 is a fragmentary elevation view of the valve assembly taken generally along line 2—2 of FIG. 1.

Referring now to FIGS. 1 and 2, valve assembly 20 of the invention comprises a main cylindrical valve body 22 having a vertical fluid inlet section 24 provided with a flanged end 26, and a lateral outlet section 28 provided with a flanged end 30. Assembly 20 is mounted in place in a fluid line as shown in the drawings with inlet flange 26 positioned in a horizontal plane.

A hollow piston valve member 31 controls the fluid flow from inlet section 24 to outlet section 28, with the piston having a substantially cylindrical annular wall portion 32 integral with a bottom head wall 33. Piston 31 is vertically slidably mounted in an integral valve guide cylinder or skirt 35 which has upper and lower ring sections 36 and 38, the latter of which seats within an enlarged diameter section 40 at the upper end of inlet section 24. Ring sections 36 and 38 are connected by a plurality of circumferentially spaced vertical guide ribs 42 which guide vertical movement of piston 31. A pair of O-rings 44 and 46 provide seals between body 22 and ring sections 36 and 38, respectively.

A rigid sealing ring 48 and resilient O-ring 50 are retained in place in lower ring section 38 by snap ring 52, and the outer peripheral rim edge 54 of piston head 33 seats on rings 48 and 50 in the valve closed position.

A flexible annular diaphragm 56 has its outer edge fixed between the upper end of ring section 36 of cylinder 34 and a circular clamp 58 fastened to section 36 by screws 60. The inner edge of diaphragm 56 is fixed between the upper end of piston wall 32 and a retainer ring 60 fastened to wall 32 by screws 62. Diaphragm 56 permits vertical movement of piston 31 and provides a rolling seal between cylinder 35 and hollow piston 31.

It should be noted that to facilitate overall assemblage, piston 31 and cylinder 35 are preassembled together and then installed as a unit into body 22 through its upper open end until lower ring section 38 of cylinder 35 seats in enlarged section 40 of inlet section 24. A cover plate 63 is then fastened to body 22 via screws 64, with an O-ring seal 65 provided between clamp ring 58, body 22, and cover 63.

A variable volume control pressure chamber 66 is defined by the interior of piston 31, diaphragm 56, clamp 58, and the bottom of cover 63. High pressure inlet fluid is introduced into chamber 66 through a piston plug extension and strainer assembly 67 (FIG. 9) which includes a plug 68 that threads into a central opening in piston head 33 and has a narrow fluid passage 70. A strainer screen 72 is soldered at its upper end to plug nut 74 which threads onto the lower end of plug 68 and is retained in place by a roll pin 76. An extension tube 78 threads into the upper end of plug 68 and an end cap 80 threads onto the upper end of tube 78, with the end cap having a side opening 82 which is spaced a substantial distance above head 33.

Figure 9:
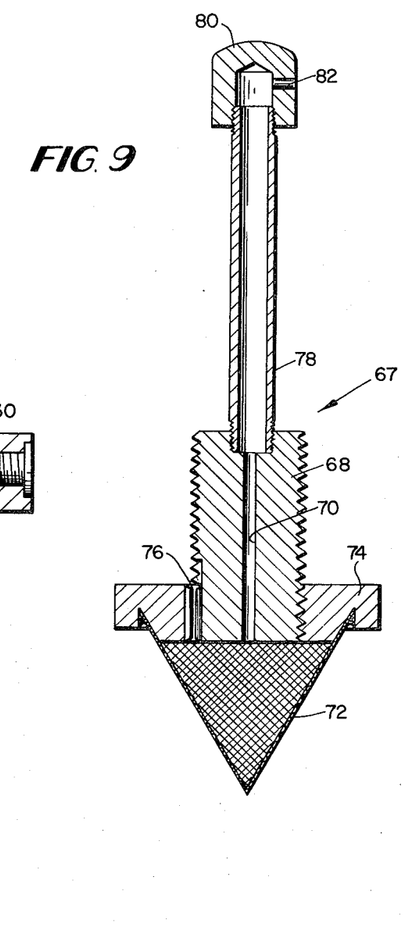
FIG. 9 is an enlarged view of the piston plug extension assembly by which inlet fluid is passed into the main hollow piston valve member.

Fluid from inlet section 24 passes through strainer 72, passage 70, tube 78 and opening 82 into pressure chamber 66. If all of the fluid is retained in chamber 66, the pressure on opposite sides of piston head 33 will be equalized and piston 31, under its own weight, will descend to a valve closed position in which peripheral edge 54 sealingly seats on seal rings 48 and 50.

Opening of piston 31 and the degree to which it is open to control the flow rate from inlet section 24 to outlet section 28 is controlled by a pilot regulator unit 90 (FIGS. 1 and 3–6) mounted in compact fashion directly on cover plate 63 and by a manually controlled shut-off gate valve 92 (FIGS. 1, 2, 10 and 11). Pilot unit 90 and gate valve 92 are connected in series in a drain flow path extending from pressure chamber 66 to a conduit 94 which is connected via fitting 96 to a passage 98 which is located in the side wall of valve outlet section 28 closely adjacent the bottom of the outlet section. When valve 92 is open, fluid is drained from chamber 66 through pilot unit 90, valve 92 and conduit 94 into outlet section 28 at a greater rate than that at which inlet fluid can be introduced into chamber 66 through assembly 67. Consequently, the pressure in chamber 66 is reduced and a pressure differential is created across piston head 33 so that piston 31 is raised to permit fluid flow from inlet section 24 to outlet section 28. The degree to which piston 31 is opened and thus the flow rate through assembly 20 is controlled by pilot unit 90, and this will be better understood from the description hereinbelow. As is apparent, chamber 66 is of substantial volume and contains a relatively large amount of fluid. This construction produces smooth accurate positioning and control of piston 31.

As shown in FIGS. 1 and 3–6, pilot regulator unit 90 includes a diaphragm actuator 100 having a flexible diaphragm 102, the outer peripheral edge of which is sandwiched between top and bottom cover plates 104 and 106, respectively, all of which are connected together and fastened to cover 63 by a plurality of circumferentially spaced screws 108. An O-ring 110 seals between bottom cover plate 110 and cover 63.

Figures 6, 6A:
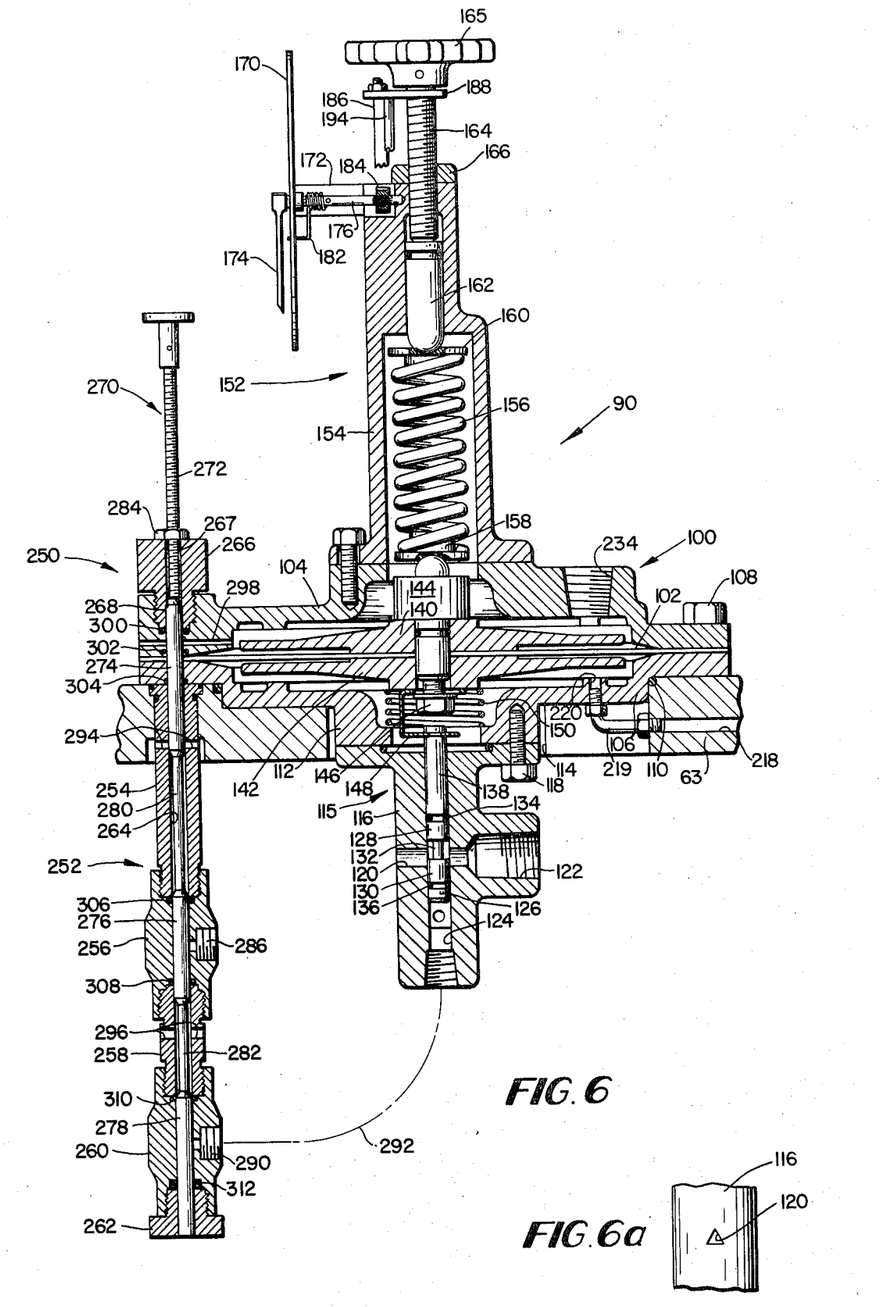
FIG. 6 is an enlarged, fragmentary, partly sectioned elevation view of the pilot regulator unit taken generally along line 6—6 of FIG. 4.
FIG. 6a is a fragmentary view taken along line 6a—6a of FIG. 6 and illustrating the pilot valve inlet port which is of equilateral triangular configuration.

Bottom plate 106 has a central hub portion 112 which extends into a central opening 114 in cover 63, and a pilot valve 115 has a body 116 which is fastened to hub 112 by screws 118 and extends downwardly into pressure chamber 66. Valve body 116 has a side inlet port 120 in open fluid communication with chamber 66 and a threaded side discharge port 122, both of which intersect a vertical bore 124 in which a pilot valve member 126 is vertically slidable. Valve member 126 includes upper and lower enlarged diameter sections 128 and 130 and an intermediate reduced diameter section 132 which permits fluid flow between ports 120 and 122 when aligned with the ports. As shown in FIG. 6a, port 120 is specially shaped as an equilateral triangle to provide a smooth gradual linear control of fluid flow from chamber 66. O-rings 134 and 136 provide seals at opposite ends of sections 128 and 130. A valve stem 138 is integral with and extends upwardly from section 128 through bottom plate 106 of actuator 100.

Diaphragm buttons 140 and 142 are provided on the top and bottom of diaphragm 102, and a clamping screw 144 passes through buttons 140 and 142 and diaphragm 102 and a nut 146 threads on the end of the screw to fasten the buttons and diaphragm together. A yoke member 148 has its upper end fastened between nut 146 and button 142 and its lower end connected to the upper end of valve stem 138 so that movement of diaphragm 102 causes movement of stem 138 and pilot valve member 126. A light coil spring 150 acts between plate 106 and button 142 to bias diaphragm 102 upwardly.

Figure 7:
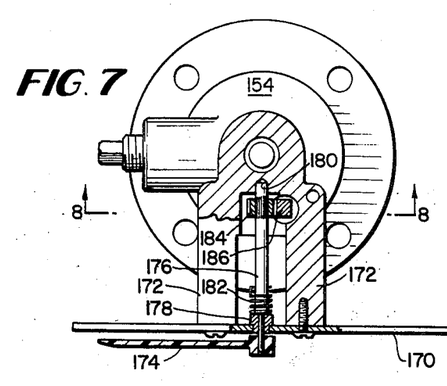
FIG. 7 is a fragmentary plan view taken generally along line 7—7 of FIG. 1 and illustrating the flow rate indicating mechanism.
Figure 8:
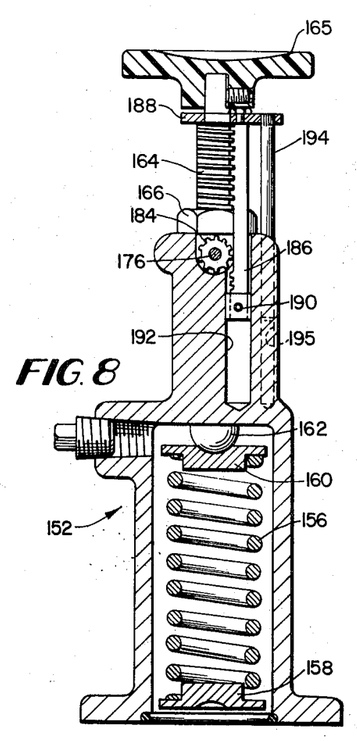
FIG. 8 is a fragmentary section view of the flow rate indicating mechanism taken generally along line 8—8 of FIG. 7.

A set point position for diaphragm 102 and pilot valve member 126, corresponding to a desired flow rate past main valve piston 31, is established by a flow rate selector and indicator assembly 152 which includes a housing 154 fixed on cover plate 104 and a heavy coil spring 156 within the housing, with the spring having end caps 158 and 160. End cap 158 engages against a spherical end surface on screw 144 and cap 160 engages a plunger 162 slidable in a bore at the upper end of housing 154. A hand operated adjusting rod 164 having a knob 165 threads into the upper end of housing 154 and engages against plunger 162. Any adjustment of rod 164 is transmitted through plunger 162, spring 156 and screw 144 to diaphragm 102 and pilot valve member 126. A jam nut 166 locks rod 164 in its set position.

The desired set flow rate for the valve assembly is indicated by a dial plate 170 which is fixed to a pair of spaced, lateral support arms 172 formed integrally with the upper end of housing 154. A pointer 174 is fixed on the outer end of shaft 176 rotatably supported in a bushing 178 and a recess 180 in housing 154. A torsion spring 182 has its opposite ends fixed to shaft 176 and dial plate 170. A pinion gear 184 is fixed on the inner end of shaft 176 and is driven by a rack 186 whose upper end is fixed to a guide plate 188 which is loosely mounted on adjusting rod 164. A bushing 190 is fixed on the lower end of rack 186 and slides within a blind bore 192 in housing 154. A guide rod 194 has its upper end fixed to plate 188 and is slidable in a blind bore 195 in housing 154. Rod 194 prevents plate 188 from rotating with adjusting rod 164.

As adjusting rod 164 is vertically adjusted, rack 186 will drive pinion 184 to rotate shaft 176 and pointer 174. Thus a desired flow rate past main valve piston 31 is selected merely by turning knob 165 and rod 164 until pointer 174 aligns with the appropriate rate indicating markings on dial 170.

A protective housing unit 196 (FIGS. 1 and 2) is mounted on valve cover 63 and encloses regulator unit 90 and assembly 152. Unit 196 includes a top cover member 197 pivotally mounted at 198 to be raised and lowered, and a transparent window cover 199 pivotally connected to member 197.

During operation of the valve assembly, diaphragm 102 acts in response to inlet fluid pressure fluctuations as indicated by the pressure differential across a vane and orifice plate assembly 200 mounted in inlet section 24 to vary the position of pilot valve member 126 and thereby vary the fluid drained from chamber 66. This in turn varies the operating position of piston 31 to maintain a constant flow rate from inlet section 24 to outlet section 26 even though inlet fluid pressure varies.

As shown in FIGS. 1 and 2, assembly 200 includes a plurality of flow straightening vanes 202 extending axially within inlet section 24 and a plurality of circular plate segments 204 interconnecting vanes 202 and defining an orifice 206. The outer end of each vane 202 has an integral tab 208 which is screw connected to flange 26 to maintain assembly 200 in place.

Figure 4:
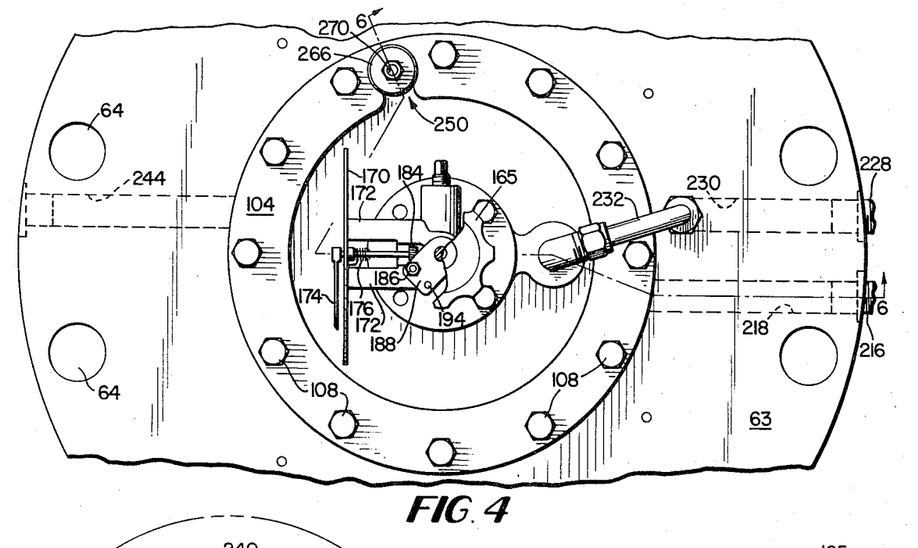
FIG. 4 is a fragmentary top plan view of the pilot regulator unit taken generally along line 4—4 of FIG. 3.

The pressure upstream of orifice 206 is delivered to the bottom of diaphragm 102 via opening 210, fitting 212, and conduit 214, the upper end of which is connected via fitting 216 to the outer end of a lateral passage 218 formed in cover 63 (See FIGS. 4 and 6). The inner end of passage 218 is connected via conduit 219 with an opening 220 in the bottom diaphragm cover plate 106.

The pressure downstream of orifice 206 is delivered to the top of diaphragm 102 via opening 222, fitting 224, and conduit 226, the upper end of which is connected via fitting 228 to another lateral passage 230 in cover 63. A conduit 232 connects the inner end of passage 230 to opening 234 in the top diaphragm cover plate 104.

Figure 3:
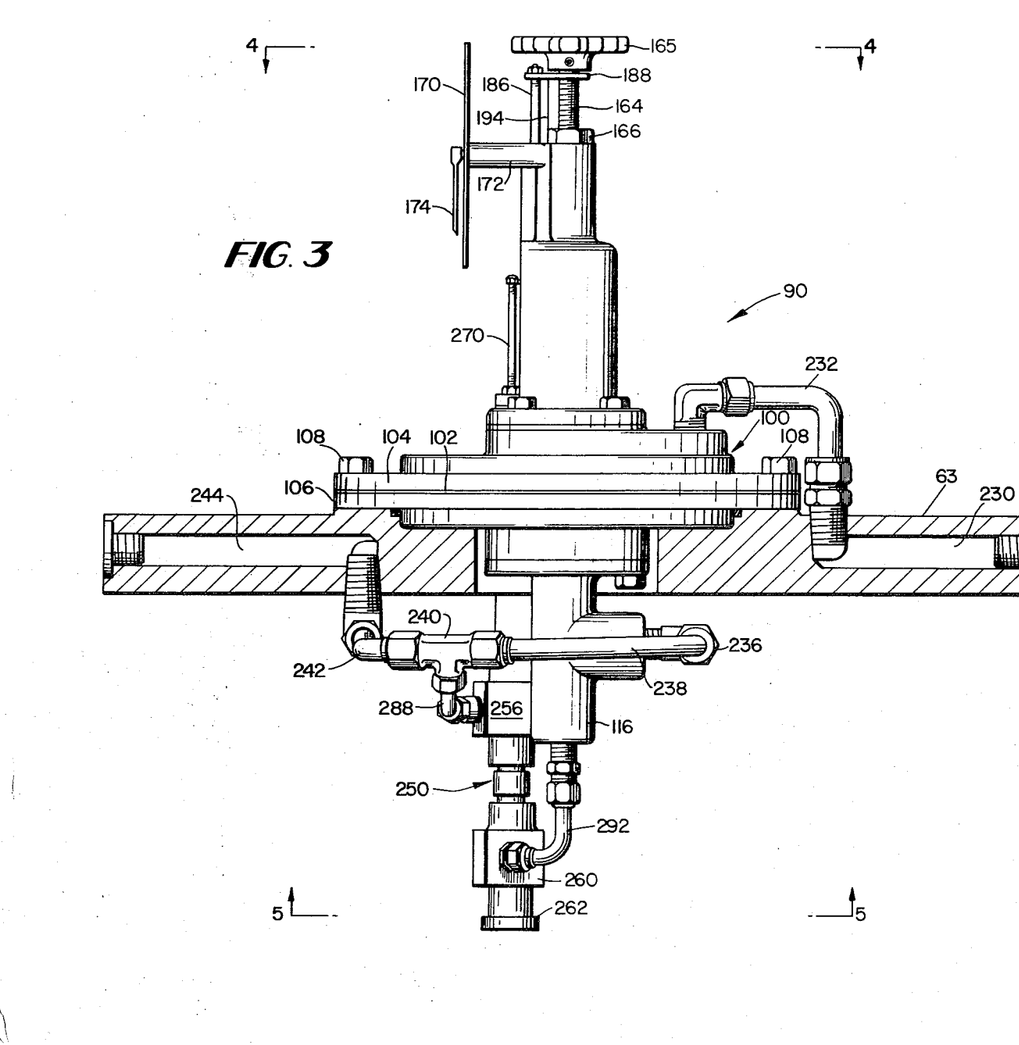
FIG. 3 is an enlarged fragmentary view of the pilot regulator unit as viewed generally along line 3—3 of FIG. 1.
Figure 5:
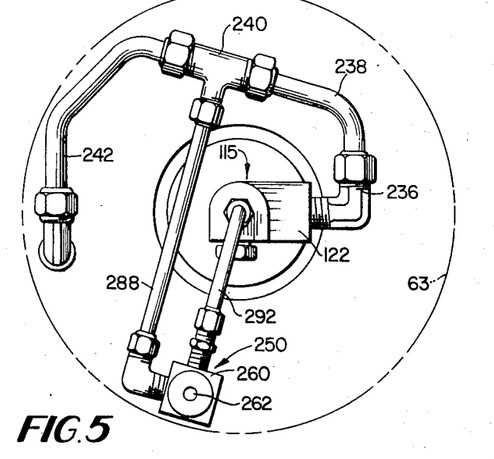
FIG. 5 is a fragmentary bottom plan view of the pilot regulator unit taken generally along line 5—5 of FIG. 3.

As shown best in FIGS. 3 and 5, discharge port 122 of pilot valve 116 is connected via fitting 236, conduit 238, T-fitting 240, and conduit 242 to another lateral passage 244 in cover 63. As shown in FIGS. 1 and 2, conduit section 246 connects the outer end of passage 244 with gate valve 92 to discharge the fluid drained from chamber 66 through valve 92 and conduits 94 and 96 to outlet section 28.

Pilot regulator unit 90 also includes a normally closed air bleed valve assembly 250 (FIGS. 1, 3, 5 and 6) which is used when valve assembly 20 is placed in a line to initially vent air from the entire assembly and is also used following valve shut down to drain fluid from the regulator body and lines. Bleed assembly 250 includes a tubular section 252 suspended from cover 63 and located within pressure chamber 66. Section 252 is formed by tube 254, T-fitting 256, tube 258, T-fitting 260, and plug 262, all of which are connected together to define a vertical vent passage 264 which continues upwardly through aligned openings in diaphragm 202, diaphragm cover plates 104 and 106, and a valve seat member 266 which threads into upper cover plate 104. Member 266 has an upper reduced diameter passage section 267 and a valve seat 268 immediately therebeneath. An integral valve rod 270 is vertically movable in passage 264 and includes an upper threaded section 272, enlarged diameter sections 274, 276, 278 which closely, slidably fit within passage 264, and reduced diameter sections 280 and 282. With bleed assembly 250 in a closed position, the upper tapered end of section 274 sealingly engages against seat 268 and rod 270 is locked in place by tightening down on a stop nut 284.

As shown in FIGS. 3 and 5, T-fitting 256 has a lateral opening 286 which is connected via conduit 288 to the side leg of T-fitting 240 in the discharge line from the pilot valve exhaust port 122. Similarly, T-fitting 260 has a lateral opening 290 which is connected via conduit 292 with the bottom open end of bore 124 in pilot valve body 116. Tube sections 254 and 258 have lateral openings 294 and 296, respectively, which communicate pressure chamber 66 with passage 264. A lateral passage 298 in plate 109 intersects passage 264 and extends into communication with the space above diaphragm 102.

With the valve rod 270 in its normally closed position as shown in FIG. 6, a plurality of O-rings 300, 302, 304, 306, 308, 310, and 312 provide seals around rod sections 274, 276 and 278 and prevent any flow through vent passage 264. Operation of bleed assembly 250 will be better understood from the summary description hereinbelow.

Figure 10:
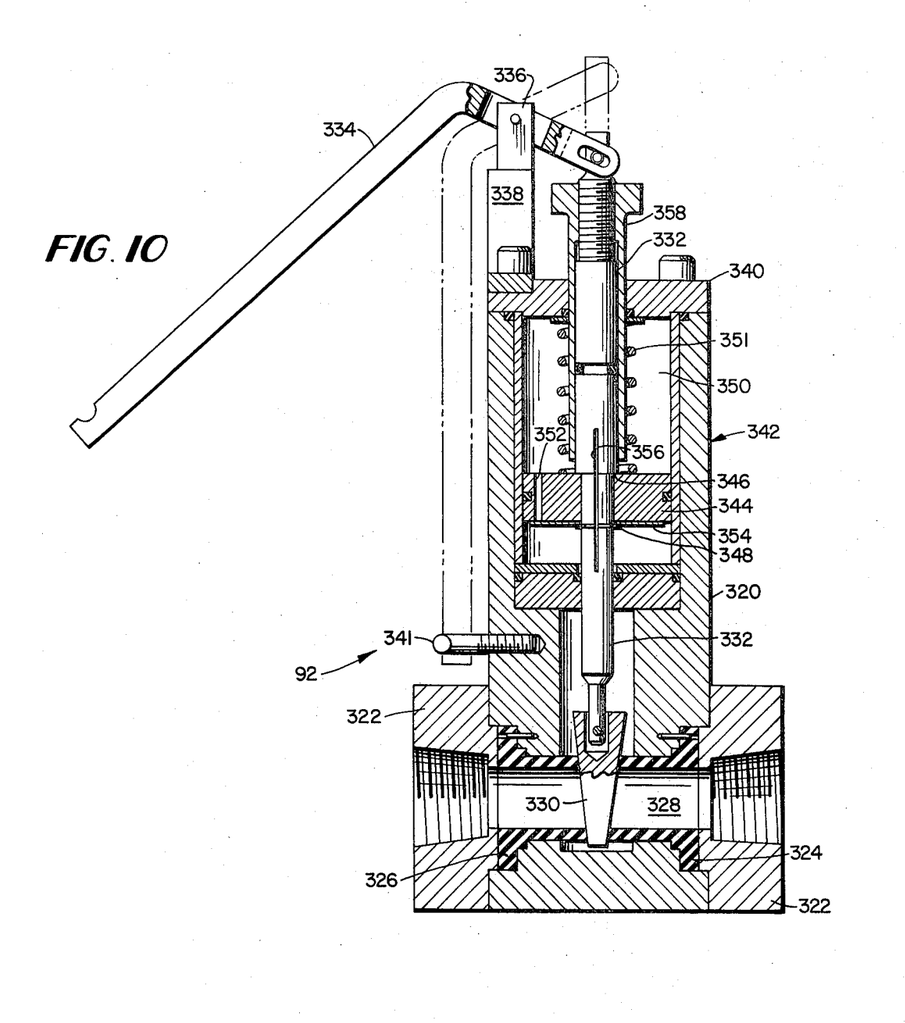
FIG. 10 is a fragmentary section elevation view of the novel shut-off gate valve located in the drain line from the pressure chamber in the piston valve member between the pilot regulator unit and the outlet of the main valve.
Figure 11:
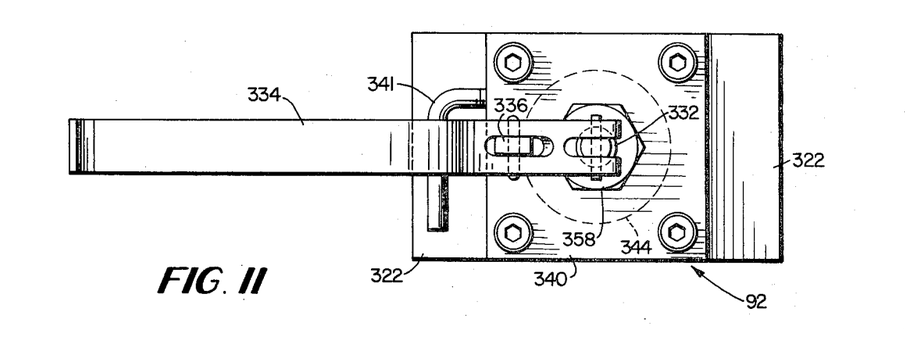
FIG. 11 is a top plan view of the gate valve of FIG. 10.

Referring to FIGS. 10 and 11, the shut-off gate valve 92 includes a valve body 320 having a pair of end blocks 322 connected thereto, with seal members 324 and 326 mounted within the body and defining a flow passage 328. A vertically movable, tapered gate member 330, shown in closed position in which it seals with members 324 and 326, is actuated by a valve stem 332 reciprocated by handle 334 which is pivotally supported at 336 on a bracket 338 fixed on cover plate 340 of body 320. In FIG. 10, handle 334 is illustrated in full line in the valve closed position and in broken line in the valve open position in which it may be locked by a stop pin 341 which is pivotally mounted on body 320.

A dashpot unit 342 controls movement of stem 332 and prevents any abrupt opening or closing of gate member 330. Unit 342 includes piston 344 fixed on stem 332 between shoulder 346 and retaining ring 348, the piston being reciprocable in a chamber 350 filled with a dampening fluid-silastic gum substance, and biased in a downward valve closed position by spring 351. A passage 352 extends between opposite sides of piston 344 and a check valve spring member 354, mounted between the piston and ring 348, permits fluid to pass from the top to the bottom of the piston as it is moved upwardly in a gate opening direction.

A slot 356 is formed in stem 332 and has its end sections extending beyond the end faces of piston 344 in communication with the fluid on opposite sides of the piston. As gate member 330 is moved downwardly from an open to a closed position under the influence of spring 351, the dampening fluid on the bottom of piston 344 is passed to the top of the piston via slot 356. A sleeve 358 is axially adjustably mounted on the upper portion of stem 332, and the lower end of the sleeve is adapted to cover and restrict a selected portion of the upper end of slot 356. Thus, the setting of sleeve 358 will determine the rate at which the dampening fluid is passed from the bottom to the top of piston 344, thereby controlling the rate at which piston 344 and stem 332 are moved downwardly to cause gate member 330 to gradually restrict and finally close the drain passage from pressure chamber 66. This in turn affords a gradual smooth closing of piston 31. It should be noted that gate member 330 may be opened reasonably quickly due to passage 352 and spring 354, independently of the setting of sleeve 358.

As discussed hereinabove, assembly 20 also functions to register the total flow of fluid past the main piston 31. This is accomplished by a flow register or totalizer unit 360 (FIG. 1) mounted via plate 362 on inlet section 24 adjacent a side opening 364 in section 24, with its flow measuring propeller 366 positioned within section 24 immediately downstream of the flow straightening vanes 202 of orifice assembly 200. Thus, the fluid leaving vanes 202 and driving propeller 366 will have essentially laminar flow and provide an accurate totalizing readout on register unit 360.

In summary operation, valve assembly 20 is placed in a water system in the vertical position shown in FIGS. 1 and 2 with inlet flange 26 mounted on a horizontal support flange of a supply pipe (not shown) and outlet flange 30 connected to an outlet duct, e.g., a flexible duct leading to water irrigation ducts in the field. Initially, air trapped in the valve assembly must be vented to atmosphere. This is accomplished by first closing gate valve 92 and adjusting rod 164 downwardly to open pilot valve 126. Valve piston 31 will be closed under its own weight. Stop nut 284 is then threaded upwardly on rod section 272 a predetermined distance and rod 270 is then depressed downwardly until nut 284 rests on member 266. Rod 270 will be positioned in a valve open position with threaded section 272 opposite O-rings 300, 302, and 304, reduced rod section 280 opposite O-rings 306 and 308, and reduced rod section 282 opposite O-rings 310 and 312.

A shut-off valve (not shown) located upstream in the main supply line is then opened slightly to slowly fill pressure chamber 66 with water via assembly 67 and also fill the chambers above and below diaphragm 102 with water via conduits 214 and 226. As this occurs, air in chamber 66 is passed via ports 294 and 296 into bleed passage 264 and upwardly past rod 270 out of the upper end of passage 264 to atmosphere. Simlarly, air trapped within the pilot regulator unit is passed via conduits 288 and 292 and passage 298 to the bleed passage 264. When chamber 66 is filled and all the air has been vented, rod 270 is pulled up as far as possible with the upper end of rod section 274 seated against seat 268, and nut 284 is tightened fast against member 266. The shut-off valve upstream in the main supply line is then opened completely.

Knob 165 and rod 166 are then adjusted to set pilot valve member 126 at a predetermined operating position corresponding to a desired flow rate through valve assembly 20 as indicated by pointer 174 and dial plate 170.

After unit 90 has been thus set, gate valve 92 is opened completely by depressing lever 334 to the broken line position of FIG. 10 and locking it open by pin 341, thereby causing water to be drained from chamber 66 through the series connected pilot valve 115 and gate valve 92 to passage 98 in outlet section 28. As this occurs, the pressure in chamber 66 drops below the inlet water pressure acting against the bottom of piston head 33, and the pressure differential causes piston 31 to be raised and thereby permit water flow from inlet section 24 to outlet section 28. The degree to which piston 31 is raised or opened is determined by the setting of pilot regulator unit 90.

During operation fluctuations in inlet water pressure are indicated by the pressure differential across orifice 206 of the plate assembly 200, and diaphragm 102 is actuated in response to this pressure differential to control the position of pilot valve member 126, which in turn controls the rate at which fluid is drained from chamber 66. This in turn controls the pressure differential across piston head 33 and the operating position of piston 31 to maintain a substantially constant flow rate regardless of inlet water pressure variations.

For example, an increase in the inlet water pressure is transmitted to the bottom of diaphragm 102 via conduit 214 and passages 218 and 220, and the diaphragm and pilot valve 126 are raised to cause pilot valve section 130 to restrict the drain flow passage through the pilot valve. Consequently, the amount of fluid drained from chamber 66 is reduced and the pressure in chamber 66 increases to lower piston 31, thereby further restricting the main flow passage past piston 31 to compensate for the increase in inlet water pressure and to maintain a constant flow rate.

Similarly, a decrease in inlet water pressure causes diaphragm 102 to move downwardly to bring a greater portion of pilot valve section 132 into alignment with ports 120 and 122, thereby increasing the amount of fluid drained from chamber 66 and causing the pressure in chamber 66 to drop. Consequently, piston 31 is raised to increase the main flow path past the piston to compensate for the decrease in inlet water pressure and to maintain a constant flow rate.

The particular location of passage 98 at the bottom of outlet section 28 significantly improves operation of the valve assembly, especially when the main piston 31 is adjusted for minimum flow rates. This arrangement ensures that fluid passing through outlet section 28 flows across the outlet opening of passage 98 to produce a siphoning action in the passage, thereby reducing response time at low flow settings or when low line pressure exists.

To completely shut off flow through valve assembly 20, it is necessary only to shut off gate valve 92 and thereby block the drain passage from pressure chamber 66. Although it is desirable to close piston 31 as quickly as possible, nevertheless it is necessary to avoid an excessively rapid, abrupt closure of the piston to prevent damage to the valve assembly and the water distribution piping system. Gate valve 92 prevents such an abrupt closure. After pin 341 is unlocked to release lever 334 gate 330 will be closed slowly by spring 351 to gradually restrict the drain path from chamber 66, thereby causing a gradual pressure increase in chamber 66 and smooth closure of piston 31 until the pressures on opposite sides of piston head 33 are balanced and piston 31 is completely closed. As discussed hereinabove, the rate at which gate valve 92 is closed may be adjusted by adjustment of sleeve 358. This enables selection of the optimum time period for closure of piston 31 so that the piston is closed as rapidly as possible without damaging the valve assembly and piping components.

As mentioned hereinabove, bleed valve assembly 250 is also used to drain regulator unit 90 and its associated flow lines of fluid upon shut-down of the irrigation line. At shut down the on-off valve (not shown) located upstream of valve assembly 20 is closed to shut off flow and main piston 31 rests in a closed position. Fluid drains from chamber 66 back through opening 82 and assembly 67 into inlet section 24. By loosening nut 284 and depressing valve rod 270 to a valve open position for bleed valve assembly 250, fluid from regulator 90 is drained back into chamber 66. Fluid below the level of opening 82 is retained in chamber 66, and to avoid damage to the valve components including piston 31 in freezing temperature conditions, the bottom inside surface of piston wall portion 32 is tapered below the drain level of opening 82. Consequently as ice tends to form, the fluid may expand in an upward direction to prevent freeze damage to the valve.

The invention may be embodied in other specific forms without departing from the spirit or essential characteristics thereof. The present embodiment is therefore to be considered in all respects as illustrative and not restrictive, the scope of the invention being indicated by the seal claims rather than by the foregoing description, and all changes which come within the meaning and range of equivalency of the claims are therefore intended to be embraced therein.

What is claimed and desired to be secured by Letters Patent is:

1. A valve assembly comprising body means having fluid inlet means and fluid outlet means and seat means therebetween, a hollow piston valve member reciprocably mounted in said body means for controlling fluid flow between said inlet means and said outlet means, said piston valve member including annular wall means and a piston head having a seating surface adapted to engage said seat means in a valve closed position, a pressure chamber defined at least in part by the interior of said hollow piston valve member and comprising cylinder means mounted within said body means for slidably receving said piston member and including a plurality of circumferentially spaced guide means for guiding reciprocating movement of said piston member, and seal means provided between said piston member and said cylinder means for sealing said pressure chamber, said seal means comprising a flexible diaphragm which provides a roll type seal between said piston member and said cylinder means, means for introducing inlet fluid into said pressure chamber, and regulator means for draining fluid from said pressure chamber at a predetermined rate to establish a pressure differential across said piston head which causes said piston member to maintain a substantially constant rate of flow from said inlet means to said outlet means.

2. A valve assembly comprising body means having fluid inlet means and fluid outlet means and seat means therebetween, a hollow piston valve member reciprocably mounted in said body means for controlling fluid flow between said inlet means and said outlet means, said piston valve member including annular wall means and a piston head having a seating surface adapted to engage said seat means in a valve closed position, a pressure chamber defined at least in part by the interior of said hollow piston valve member, means for introducing inlet fluid into said pressure chamber, and regulator means for draining fluid from said pressure chamber at a predetermined rate to establish a pressure differential across said piston head which causes said piston member to maintain a substantially constant rate of flow from said inlet means to said outlet means, said regulator means comprising pilot valve means mounted on said body means and having an inlet port communicating with said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means said regulator means also comprising adjustable means for adjusting said pilot valve means to a predetermined set position corresponding to a desired flow rate between said inlet means and said outlet means, and indicator means connected to said adjustable means for indicating said desired flow rate.

3. A valve assembly comprising body means having fluid inlet means and fluid outlet means and seat means therebetween, a hollow piston valve member reciprocably mounted in said body means for controlling fluid flow between said inlet means and said outlet means, said piston valve member including annular wall means and a piston head having a seating surface adapted to engage said seat means in a valve closed position, a pressure chamber defined at least in part by the interior of said hollow piston member, means for introducing inlet fluid into said pressure chamber, regulator means for draining fluid from said pressure chamber at a predetermined rate to establish a pressure differential across said piston head which causes said piston member to maintain a substantially constant rate of flow from said inlet means to said outlet means, said regulator means comprising pilot valve means mounted on said body means and having an inlet port communicating with said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means, and a plurality of flow straightening vanes mounted in said inlet means, and a flow totalizing unit mounted on said inlet means and including a flow measuring element located downstream of said vanes, whereby the total fluid flow through the valve assembly is measured.

4. A valve assembly comprising body means having fluid inlet means and fluid outlet means and seat means therebetween, a hollow piston valve member reciprocably mounted in said body means for controlling fluid flow between said inlet means and said outlet means, said piston valve member including annular wall means and a piston head having a seating surface adapted to engage said seat means in a valve closed position, a pressure chamber defined at least in part by the interior of said hollow piston member, means for introducing inlet fluid into said prsssure chamber, regulator means for draining fluid from said pressure chamber at a predetermined rate to establish a pressure differential across said piston head which causes said piston member to maintain a substantially constant rate of flow from said inlet means to said outlet means, said regulator means comprising pilot valve means mounted on said body means and having an inlet port communicating with said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means and a vane and orifice assembly mounted in said inlet means, said assembly including orifice plate means and a plurality of flow straightening vanes, said diaphragm actuator means being operated in response to the pressure differential across said orifice plate means, and a flow totalizing unit mounted on said inlet means and including a flow measuring element located downstream of said flow straightening vanes to measure the total fluid flow through the valve assembly.

5. A valve assembly comprising body means having fluid inlet means and fluid outlet means and seat means therebetween, a hollow piston valve member reciprocably mounted in said body means for controlling fluid flow between said inlet means and said outlet means, said piston valve member including annular wall means and a piston head having a seating surface adapted to engage said seat means in a valve closed position, a pressure chamber defined at least in part by the interior of said hollow piston member, means for introducing inlet fluid into said pressure chamber, regulator means for draining fluid from said pressure chamber at a predetermined rate to establish a pressure differential across said piston head which causes said piston member to maintain a substantially constant rate of flow from said inlet means to said outlet means, said regulator means comprising pilot valve means mounted on said body means and having an inlet port communicating with said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means and shut-off valve means connected between said pilot valve means and said outlet means for blocking the fluid drain path from said pressure chamber, thereby causing said piston member to close.

6. A valve assembly as defined in claim 5, said shut-off valve means comprising a gate member reciprocable between open and closed positions, and actuator means connected to said gate member to effect a gradual controlled closing of said gate member.

7. A valve assembly as defined in claim 6, said actuator means comprising a stem connected to said gate member, lever means connected to said stem, a dash-pot unit including a dampening fluid chamber, a dampening piston connected to said stem and reciprocable in said dampening fluid chamber, spring means biasing said dampening piston in a valve closed direction, first passage means for passing dampening fluid between opposite sides of said dampening piston, and adjustable means for controlling the rate at which dampening fluid is passed through said first passage means as said dampening piston and said gate member are moved in a valve closing direction.

8. A valve assembly as defined in claim 7, said first passage means comprising a slot formed in said stem and having end sections on opposite sides of said dampening piston, and said adjustable means comprising a sleeve mounted on said stem and adjustable therealong to cover a selected portion of one of said end sections of said slot.

9. A valve assembly as defined in claim 7, comprising second passage means extending through said dampening piston and relief valve means associated with said second passage means and adapted to open to permit flow of dampening fluid through said second passage means as said dampening piston and said gate member are moved in a valve opening direction.

10. A valve assembly as defined in claim 7, said lever means being connected to the upper end of said stem and being actuatable to move said stem and gate member to a valve open position, and retainer means for locking said lever means in a valve open position.

11. A valve assembly comprising body means having fluid inlet means and fluid outlet means and seat means therebetween, a hollow piston valve member reciprocably mounted in said body means for controlling fluid flow between said inlet means and said outlet means, said piston valve member including annular wall means and a piston head having a seating surface adapted to engage said seat means in a valve closed position, a pressure chamber defined at least in part by the interior of said hollow piston member, means for introducing inlet fluid into said pressure chamber, and regulator means for draining fluid from said pressure chamber at a predetermined rate to establish a pressure differential across said piston head which causes said piston member to maintain a substantially constant rate of flow from said inlet means to said outlet means, said regulator means comprising pilot valve means mounted on said body means and having an inlet port communicating with said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means, said regulator means also comprising means for venting air from said pressure chamber, said pilot valve means, and said diaphragm actuator means when the valve assembly is initially placed in a flow line.

12. A valve assembly comprising body means having fluid inlet means and fluid outlet means and seat means therebetween, a hollow piston valve member reciprocably mounted in said body means for controlling fluid flow between said inlet means and said outlet means, said piston valve member including annular wall means and a piston head having a seating surface adapted to engage said seat means in a valve closed position, a pressure chamber defined at least in part by the interior of said hollow piston member, means for introducing inlet fluid into said pressure chamber, and regulator means for draining fluid from said pressure chamber at a predetermined rate to establish a pressure differential across said piston head which causes said piston member to maintain a substantially constant rate of flow from said inlet means to said outlet means, said regulator means comprising pilot valve means mounted on said body means and having an inlet port communicating with said pressure chamber and an outlet port communicating with said fluid outlet means, said inlet port being shaped as an equilateral triangle, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means.

13. A valve assembly comprising valve body means having a bottom fluid inlet means provided with a valve seat and a side fluid outlet means, a hollow piston valve member reciprocably mounted in said body means between a valve open position and a valve closed position, said piston valve member including annular wall means and a bottom piston head facing said inlet means and engaging said valve seat in a valve closed position, a pressure chamber defined at least in part by the interior of said hollow piston valve member, and comprising cylinder guide means mounted in said body means with said piston valve member reciprocably mounted in said guide means, said guide means having an open lower end aligned with said inlet means and a plurality of circumferentially spaced vertical guide ribs which guide movement of said piston member and permit flow communication between said inlet means and said outlet means, and seal means extending between the upper ends of said piston member and said guide means for sealing said pressure chamber, said seal means comprising a flexible diaphragm which provides a roll type seal between said piston member and said guide means, passage means in said piston head for introducing inlet fluid into said pressure chamber, and regulator means for draining fluid from said pressure chamber to said fluid outlet means at a predetermined rate to establish a pressure differential across said piston head which causes said piston member to maintain a substantially constant rate of flow from said fluid inlet means to said fluid outlet means.

14. A valve assembly as defined in claim 13, wherein said valve seat is defined by seal ring means mounted in the lower end of said guide means, and said piston member and said guide means are joined together as a unit to facilitate assemblage thereof in said body means.

15. A valve assembly comprising valve body means having a bottom fluid inlet means provided with a valve seat and a side fluid outlet means, a hollow piston valve member reciprocably mounted in said body means between a valve open position and a valve closed position, said piston valve member including annular wall means and a bottom piston head facing said inlet means and engaging said valve seat in a valve closed position, a pressure chamber defined at least in part by the interior of said hollow piston member, passage means in said piston head for introducing inlet fluid into said pressure chamber, and regulator means for draining fluid from said pressure chamber to said fluid outlet means at a predetermined rate to establish a pressure differential across said piston head which causes said piston member to maintain a substantially constant rate of flow from said fluid inlet means to said fluid outlet means, said regulator means comprising pilot valve means mounted on said body means and having an inlet port located within said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means, said regulator means also comprising adjustable means for adjusting said pilot valve means to a predetermined set position corresponding to a desired flow rate between said inlet means and said outlet means, and indicator means connected to said adjustable means for indicating said desired flow rate.

16. A valve assembly comprising valve body means having a bottom fluid inlet means provided with a valve seat and a side fluid outlet means, a hollow piston valve member reciprocably mounted in said body means between a valve open position and a valve closed position, said piston valve member including annular wall means and a bottom piston head facing said inlet means and engaging said valve seat in a valve closed position, a pressure chamber defined at least in part by the interior of said hollow piston member, passage means in said piston head for introducing inlet fluid into said pressure chamber, regulator means for draining fluid from said pressure chamber to said fluid outlet means at a predetermined rate to establish a pressure differential across said piston head which causes said piston member to maintain a substantially constant rate of flow from said fluid inlet means to said fluid outlet means, said regulator means comprising pilot valve means mounted on said body means and having an inlet port located within said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means, and a plurality of flow straightening vanes mounted in said inlet means, and a flow totalizing unit mounted on said inlet means and including a flow measuring element located downstream of said vanes, whereby the total fluid flow through the valve assembly is measured.

17. A valve assembly comprising valve body means having a bottom fluid inlet means provided with a valve seat and a side fluid outlet means, a hollow piston valve member reciprocably mounted in said body means between a valve open position and a valve closed position, said piston valve member including annular wall means and a bottom piston head facing said inlet means and engaging said valve seat in a valve closed position, a pressure chamber defined at least in part by the interior of said hollow piston member, passage means in said piston head for introducing inlet fluid into said pressure chamber, regulator means for draining fluid from said pressure chamber to said fluid outlet means at a predetermined rate to establish a pressure differential across said piston head which causes said piston member to maintain a substantially constant rate of flow from said fluid inlet means to said fluid outlet means, said regulator means comprising pilot valve means mounted on said body means and having an inlet port located within said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means, and a vane and orifice plate assembly mounted in said inlet means, said assembly including orifice plate means and a plurality of flow straightening vanes, said diaphragm actuator means being operated in response to the pressure differential across said orifice plate means, and a flow totalizing unit mounted on said inlet means and including a flow measuring element located downstream of said low straightening vanes to measure the total fluid flow through the valve assembly.

18. A valve assembly comprising valve body means having a bottom fluid inlet means provided with a valve seat and a side fluid outlet means, a hollow piston valve member reciprocably mounted in said body means between a valve open position and a valve closed position, said piston valve member including annular wall means and a bottom piston head facing said inlet means and engaging said valve seat in a valve closed position, a pressure chamber defined at least in part by the interior of said hollow piston member, passage means in said piston head for introducing inlet fluid into said pressure chamber, regulator means for draining fluid from said pressure chamber to said fluid outlet means at a predetermined rate to establish a pressure differential across said piston head which causes said piston member to maintain a substantially constant rate of flow from said fluid inlet means to said fluid outlet means, said regulator means comprising pilot valve means mounted on said body means and having an inlet port located within said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means, and shut-off valve means connected between said pilot valve means and said outlet means for blocking the fluid drain path from said pressure chamber, thereby causing said piston member to close.

19. A valve assembly as defined in claim 18, said shut-off valve means comprising a gate member reciprocable between open and closed positions, and acuator means connected to said gate member to effect a gradual controlled closing of said gate member.

20. A valve assembly as defined in claim 19, said actuator means comprising a stem connected to said gate member, lever means connected to said stem, a dashpot unit including a dampening fluid chamber, a dampening piston connected to said stem and reciprocable in said dampening fluid chamber, spring means biasing said dampening piston in a valve closed direction, first passage means for passing dampening fluid between opposite sides of said dampening piston, and adjustable means for controlling the rate at which dampening fluid is passed through said first passage means as said dampening piston and said gate member are moved in a valve closing direction.

21. A valve assembly as defined in claim 20, said first passage means comprising a slot formed in said stem and having end sections on opposite sides of said dampening piston, and said adjustable means comprising a sleeve mounted on said stem and adjustable therealong to cover a selected portion of one of said end sections of said slot.

22. A valve assembly as defined in claim 20, comprising second passage means extending through said dampening piston and relief valve means associated with said second passage means and adapted to open to permit flow of dampening fluid through said second passage means as said dampening piston and said gate member are moved in a valve opening direction.

23. A valve assembly as defined in claim 20, said lever means being connected to the upper end of said stem and being actuatable to move said stem and said gate member to a valve open position, and retainer means for locking said lever means in a valve open position.

24. A valve assembly as defined in claim 18, said regulator means comprising means for venting air from said pressure chamber, said pilot valve means, and said diaphragm actuator means when the valve assembly is initially placed in a flow line.

25. A valve assembly as defined in claim 24, said air venting means comprising a bleed valve assembly having an air vent passage and means connecting said air vent passage to said pressure chamber and said pilot valve means, and a bleed valve member for closing said air vent passage.

26. In a fluid flow system, a valve assembly for controlling the rate of flow of fluid in said system and comprising a hollow piston member movable between flow cut off and variable open positions in response to differences between upstream line fluid pressure and a control pressure, means defining a control pressure chamber at least partly within said piston and connected to constantly receive upstream fluid pressure, means defining an outlet passage from said chamber containing a variable restriction valve, and regulator means for controlling the pressure in said chamber automatically responsive to upstream fluid pressure for varying the effective control pressure in said chamber applied to said member, said regulator having a pressure responsive element connected to said variable restriction valve and adjustable means for selectively moving said pressure responsive element to a set position for presetting said regulator means to provide substantially constant flow rates in the system.

27. A valve assembly comprising body means having fluid inlet means and fluid outlet means and seat means therebetween, a hollow piston valve member reciprocably mounted in said body means for controlling fluid flow between said inlet means and said outlet means, said piston valve member including annular wall means and a piston head having a seating surface adapted to engage said seat means in a valve closed position, a pressure chamber defined at least in part by the interior of said hollow piston valve member, means for introducing inlet fluid into said pressure chamber, and regulator means responsive to pressure in said inlet for draining fluid from said pressure chamber at a predetermined rate to establish a pressure differential across said piston head which causes said piston member to maintain a substantially constant rate of flow from said inlet means to said outlet means.

28. A valve assembly as defined in claim 21, comprising cylinder means mounted within said body means for slidably receiving said piston member and including a plurality of circumferentially spaced guide means for guiding reciprocating movement of said piston member and seal means provided between said piston member and said cylinder means for sealing said pressure chamber.

29. A valve assembly as defined in claim 21, said regulator means comprising pilot valve means mounted on said body means and having an inlet port communicating with said pressure chamber and an outlet port communicating with said fluid outlet means, a pilot valve member controlling flow between said inlet and outlet ports, diaphragm actuator means connected to said pilot valve member, said diaphragm actuator means being responsive to inlet fluid pressure to control said pilot valve member and the fluid drained from said pressure chamber, thereby controlling the position of said piston member to maintain a substantially constant rate of flow from said inlet means to said outlet means.

30. A valve assembly as defined in claim 29, said regulator means comprising adjustable means for adjusting said pilot valve means to a predetermined set position corresponding to a desired flow rate between said inlet means and said outlet means, and indicator means connected to said adjustable means for indicating said desired flow rate.

31. A valve assembly as defined in claim 29, comprising orifice means mounted in said inlet means, and means for operating said diaphragm actuator means in response to the pressure differential across said orifice means.

32. A valve assembly as defined in claim 29, comprising shut-off valve means connected between said pilot valve means and said outlet means for blocking the fluid drain path from said pressure chamber, thereby causing said piston member to close.

33. A valve assembly as defined in claim 32, said shut-off valve means comprising a gate member reciprocable between open and closed positions, and actuator means connected to said gate member to effect a gradual controlled closing of said gate member.

34. A valve assembly as defined in claim 29, said regulator means comprising means for venting air from said pressure chamber, said pilot valve means, and said diaphragm actuator means when the valve assembly is initially placed in a flow line.

* * * * *

UNITED STATES PATENT OFFICE
CERTIFICATE OF CORRECTION

PATENT NO. : 3,815,627
DATED : June 11, 1974
INVENTOR(S) : Thomas C. Farrell and Harry W. Fisher It is certified that error appears in the above-identified patent and that said Letters Patent are hereby corrected as shown below:

Column 9, Line 40, delete "seal" and substitute --appended--.

Column 15, Line 47, delete "low" and substitute --flow--.

Signed and Sealed this

Twenty-fourth Day of August 1976

[SEAL]

Attest:

RUTH C. MASON
Attesting Officer

C. MARSHALL DANN
Commissioner of Patents and Trademarks